(12) United States Patent
Abe et al.

(10) Patent No.: US 11,667,823 B2
(45) Date of Patent: Jun. 6, 2023

(54) URETHANE ADHESIVE COMPOSITION

(71) Applicant: Sika Hamatite Co., LTD., Hiratsuka (JP)

(72) Inventors: Megumi Abe, Kanagawa (JP); Yuichi Matsuki, Kanagawa (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 0 days.

(21) Appl. No.: 17/310,200

(22) PCT Filed: Dec. 26, 2019

(86) PCT No.: PCT/JP2019/051280
§ 371 (c)(1),
(2) Date: Jul. 26, 2021

(87) PCT Pub. No.: WO2020/158289
PCT Pub. Date: Aug. 6, 2020

(65) Prior Publication Data
US 2022/0041908 A1    Feb. 10, 2022

(30) Foreign Application Priority Data
Jan. 30, 2019  (JP) .............................. JP2019-013798

(51) Int. Cl.
| | | |
|---|---|---|
| *C09J 175/04* | (2006.01) | |
| *C08G 18/28* | (2006.01) | |
| *C08G 18/10* | (2006.01) | |
| *C08G 18/48* | (2006.01) | |
| *C08G 18/76* | (2006.01) | |
| *C08G 18/79* | (2006.01) | |
| *C09J 11/06* | (2006.01) | |

(52) U.S. Cl.
CPC ............ *C09J 175/04* (2013.01); *C08G 18/10* (2013.01); *C08G 18/2825* (2013.01); *C08G 18/4845* (2013.01); *C08G 18/7657* (2013.01); *C08G 18/791* (2013.01); *C09J 11/06* (2013.01); *C08G 2170/00* (2013.01); *C09J 2301/30* (2020.08); *C09J 2423/006* (2013.01)

(58) Field of Classification Search
CPC ......... C09J 175/04; C09J 11/06; C08G 18/10; C08G 18/2825
See application file for complete search history.

(56) References Cited

U.S. PATENT DOCUMENTS

2017/0355891 A1* 12/2017 Natsumoto ............. B32B 27/40

FOREIGN PATENT DOCUMENTS

| JP | 10-259162 A | | 9/1998 | |
|---|---|---|---|---|
| JP | 2006/096912 | * | 4/2006 | ............. C08G 18/69 |
| JP | 2010-144160 A | | 7/2010 | |
| JP | 2014-25056 A | | 2/2014 | |
| JP | 2014-31500 A | | 2/2014 | |
| JP | 2017-82118 A | | 5/2017 | |
| JP | 2017-218539 A | | 12/2017 | |

OTHER PUBLICATIONS

JP-2006/096912_Apr. 2006_English Translation.*

* cited by examiner

*Primary Examiner* — Michael L Leonard
(74) *Attorney, Agent, or Firm* — Thorpe North & Western

(57) ABSTRACT

An object of the present invention is to provide a urethane adhesive composition having excellent initial adhesiveness and excellent adhesion durability. The present invention is a urethane adhesive composition containing a urethane prepolymer (A) having an isocyanate group, an isocyanate compound (B) having an isocyanurate structure and an isocyanate group, and an adduct of a compound represented by Formula (X) below (in Formula (X), $R^{11}$ and $R^{12}$ each independently represent a hydrocarbon group) and a phenol compound.

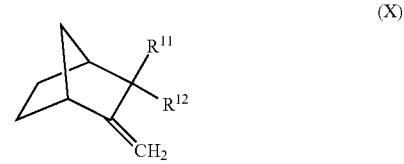

10 Claims, No Drawings

URETHANE ADHESIVE COMPOSITION

TECHNICAL FIELD

The present invention relates to a urethane adhesive composition.

BACKGROUND ART

In recent years, resin materials (e.g. olefin-based resins, and matrix resins of fiber reinforced plastic (FRP)) have been used for automobile bodies in place of steel plates from the perspective of weight reduction.

Typically, adhesion between such a resin material and a different type of raw material (e.g. glass) has been performed by using a primer after the resin material has been subjected to flame treatment.

However, since the primer contains a large amount of solvent, there has been a problem in that the environment is adversely affected.

In response to such problems, the present applicant has proposed a two-part curable urethane adhesive composition that enhances adhesiveness to an adherend (especially, a resin material such as an olefin-based resin) without the use of a primer.

For example, Patent Document 1 describes a two-part curable urethane adhesive composition including a main agent containing a urethane prepolymer (A), an isocyanurate group-containing polyisocyanate (B), and isocyanate silane (C), and a curing agent containing a compound (D) having two or more active hydrogen groups per molecule and an aromatic compound (E) represented by Formula (1). Furthermore, Patent Document 1 describes that the two-part curable urethane adhesive composition can further contain a tackifier such as a rosin resin, for example.

[Chemical Formula 1]

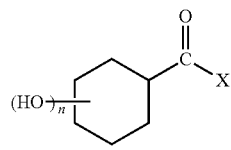

(1)

In Formula (1) above, n is an integer of from 1 to 5, and X represents a hydrogen atom, a hydroxyl group, or an alkoxy group having from 1 to 12 carbon atoms.

CITATION LIST

Patent Literature

Patent Document 1: JP 2017-218539 A

SUMMARY OF INVENTION

Technical Problem

In such circumstances, the present inventors prepared and evaluated a composition with reference to Patent Document 1 and discovered that such a composition often had low initial adhesiveness or low adhesion durability.

Thus, an object of the present invention is to provide a urethane adhesive composition that provides excellent initial adhesiveness and excellent adhesion durability.

Solution to Problem

As a result of diligent research to solve the above problems, the present inventors discovered that a desired effect can be obtained when a composition contains a urethane prepolymer (A) having an isocyanate group, an isocyanate compound (B) having an isocyanurate structure and an isocyanate group, and an adduct of a compound represented by a prescribed formula and a phenol compound, and thus the present invention was achieved.

An embodiment of the present invention is based on the findings described above, and specifically solves the problems described above by the following configurations.

[1] A urethane adhesive composition containing
  a urethane prepolymer (A) having an isocyanate group,
  an isocyanate compound (B) having an isocyanurate structure and an isocyanate group, and
  an adduct of a compound represented by Formula (X) below and a phenol compound.

[Chemical Formula 2]

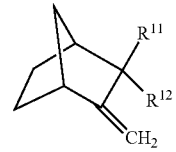

(X)

In Formula (X), $R^{11}$ and $R^{12}$ each independently represent a hydrocarbon group.

[2] The urethane adhesive composition according to [1], wherein the adduct is a reaction product of one molecule of the compound represented by Formula (X) above and one molecule of the phenol compound.

[3] The urethane adhesive composition according to [1] or [2], wherein the isocyanate compound (B) includes an isocyanurate of an aliphatic polyisocyanate.

[4] The urethane adhesive composition according to any one of [1] to [3], wherein the isocyanate compound (B) includes an isocyanurate of pentamethylene diisocyanate.

[5] The urethane adhesive composition according to any one of [1] to [4], used for adhering a base material containing an olefin resin.

Advantageous Effects of Invention

The urethane adhesive composition of the present invention has excellent initial adhesiveness and excellent adhesion durability.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Additionally, in the present specification, the value range indicated by using "from . . . to . . . " means the range including the former value as a lower limit value and the later value as an upper limit value.

In the present specification, unless otherwise indicated, a substance corresponding to each component can be used alone or in combination of two or more types thereof. In a case where a component includes two or more types of substances, content of component means the total content of the two or more types of substances.

In the present specification, the cases where at least one of initial adhesiveness or adhesion durability is superior may be referred to as "exhibiting superior effect of the present invention".

[Urethane Adhesive Composition]

The urethane adhesive composition of the present invention (composition of the present invention) is a urethane adhesive composition containing a urethane prepolymer (A) having an isocyanate group, an isocyanate compound (B) having an isocyanurate structure and an isocyanate group, and an adduct of a compound represented by Formula (X) below and a phenol compound.

[Chemical Formula 3]

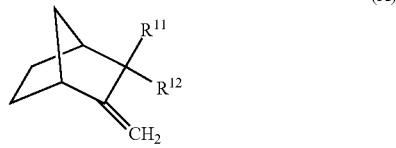

(X)

In Formula (X), $R^{11}$ and $R^{12}$ each independently represent a hydrocarbon group.

Each of the components included in the composition according to an embodiment of the present invention will be described in detail below.

<Urethane Prepolymer (A)>

The urethane prepolymer (A) contained in the composition according to an embodiment of the present invention is a urethane-based compound having an isocyanate group.

An example of a preferable aspect is one in which the urethane prepolymer (A) has a plurality of isocyanate groups (preferably, two isocyanate groups).

The urethane prepolymer (A) preferably has an isocyanate group at a molecular terminal.

As the urethane prepolymer (A), a known urethane prepolymer can be used. For example, a reaction product obtained by allowing a polyisocyanate compound to react with a compound having two or more active hydrogen-containing groups per molecule (hereinafter, abbreviated as an "active hydrogen compound") in a manner that an amount of the isocyanate group becomes excess with respect to an amount of the active hydrogen-containing groups, or the like can be used.

In the present invention, "active hydrogen-containing group" indicates "group containing an active hydrogen". Examples of the active hydrogen-containing group include a hydroxy group, an amino group, and an imino group.

Polyisocyanate Compound

The polyisocyanate compound used in the production of the urethane prepolymer (A) is not particularly limited as long as the polyisocanate compound has two or more isocyanate groups in a molecule.

Examples the polyisocyanate compound include aromatic polyisocyanates, such as tolylene diisocyanate (TDI), diphenylmethane diisocyanate (MDI), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic (the aliphatic group is a concept including linear, branched, and alicyclic aliphatic groups) polyisocyanates, such as hexamethylene diisocyanate (HDI), trimethylhexamethylene diisocyanate (TMHDI), lysine diisocyanate, norbornane diisocyanate (NBDI), transcyclohexane-1, 4-diisocyanate, isophorone diisocyanate (IPDI), bis(isocyanate methyl)cyclohexane ($H_6XDI$), and dicyclohexylmethane diisocyanate ($H_{12}MDI$); and carbodiimide-modified polyisocyanates thereof.

The polyisocyanate compound may be used alone or a combination of two or more types of the polyisocyanate compounds may be used.

Among these, an aromatic polyisocyanate is preferable, and MDI is more preferable, from the perspective of excellent curability.

Active Hydrogen Compound

The compound having two or more active hydrogen-containing groups per molecule (active hydrogen compound) that is used in the production of the urethane prepolymer (A) is not particularly limited. Examples of the active hydrogen-containing group include a hydroxy (OH) group, an amino group, and an imino group.

Suitable examples of the active hydrogen compound include a polyol compound having two or more hydroxy (OH) groups per molecule, and a polyamine compound having two or more amino groups and/or imino groups per molecule. Among these, a polyol compound is preferable.

The polyol compound is not particularly limited as long as the polyol compound is a compound having two or more OH groups. Specific examples of the polyol compound include polyether polyol; polyester polyol; (meth)acrylic polyol; polybutadiene polyol, and hydrogenated polybutadiene polyol; low-molecular weight polyhydric alcohols; and mixed polyols of these. Among these, an example of a preferable aspect is one in which the polyol compound is a polyether polyol.

The polyether polyol is not particularly limited as long as the polyether polyol is a compound having a polyether as a main chain and having two or more hydroxy groups. The term "polyether" is a group having two or more ether bonds, and specific examples thereof include a group having a total of two or more of structural units: —$R^a$—O—$R^b$—. Here, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, polyol of ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with the polyisocyanate compound.

A weight average molecular weight of the polyether polyol is preferably from 500 to 20,000, from the perspective of the viscosity of the urethane prepolymer (A), obtained by a reaction with an isocyanate compound, exhibiting a suitable fluidity at ambient temperature. In the present invention, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer (A) is preferably a urethane prepolymer formed by reacting a polyether polyol and an aromatic polyisocyanate compound, from the perspective of achieving excellent adhesiveness and excellent curability.

The urethane prepolymer (A) can be used alone or in combination of two or more kinds.

A method of producing the urethane prepolymer (A) is not particularly limited. For example, the urethane prepolymer (A) can be produced by using a polyisocyanate compound to allow from 1.5 to 2.5 mol of an isocyanate group to react with 1 mol of an active hydrogen-containing group (for example, a hydroxy group) in an active hydrogen compound, and mixing these for reaction.

The urethane prepolymer (A) can be used alone or in combination of two or more kinds.

The urethane prepolymer (A) does not include the isocyanate compound (B) described below.

(Content of Urethane Prepolymer (A))

From the perspective of being more excellent in the effect of the present invention, the content of the urethane prepolymer (A) is preferably from 20 to 80% by mass, and more preferably from 30 to 60% by mass, relative to a total amount of the composition according to an embodiment of the present invention.

<Isocyanate Compound (B)>

The isocyanate compound (B) contained in the composition according to an embodiment of the present invention is a compound having an isocyanurate structure and an isocyanate group.

<Isocyanurate Structure>

The isocyanurate structure is a structure represented by Formula (B1) below.

The isocyanate compound (B) can have at least one isocyanurate structure described above per molecule, and an example of a preferable aspect is one in which the isocyanate compound (B) has one isocyanurate structure described above.

[Chemical Formula 4]

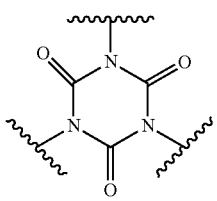

(B1)

<Isocyanate Group>

The isocyanate compound (B) can have at least one isocyanate group per molecule, preferably has a plurality of isocyanate groups, and more preferably has three or more isocyanate groups.

Linking Group

In the isocyanate compound (B), the isocyanurate structure and the isocyanate group can be bonded directly or via a linking group, and bonding via the linking group is an example of a preferable aspect.

Examples of the linking group include a hydrocarbon group that may have a heteroatom. An example of a preferable aspect is one in which the hydrocarbon group consists of only a carbon atom and a hydrogen atom.

The hydrocarbon group is not particularly limited, and specific examples thereof include aliphatic hydrocarbon groups, aromatic hydrocarbon groups, and combinations thereof. Among these, aliphatic hydrocarbon groups are preferred.

The aliphatic hydrocarbon group may be any of linear, branched, cyclic, or a combination thereof. Specific examples of the aliphatic hydrocarbon group include linear or branched aliphatic hydrocarbon groups. From the perspective of being more excellent in the effect of the present invention, the aliphatic hydrocarbon group is preferably a linear aliphatic hydrocarbon group.

The number of carbon atoms of the aliphatic hydrocarbon group is preferably from 1 to 20, more preferably from 3 to 10, and still more preferably from 4 to 5 from the perspective of being more excellent in the effect of the present invention.

From the perspective of being more excellent in the effect of the present invention, the aliphatic hydrocarbon group is preferably a methylene group, an ethylene group, a propylene group, a trimethylene group, a butylene group, a pentylene group, a hexylene group, a heptylene group, an octylene group, a nonylene group, and a decylene group, more preferably a butylene group and a pentylene group, and still more preferably a pentylene group.

The hetero atom that may be included in the hydrocarbon group is not particularly limited, and specific examples thereof include an oxygen atom, a nitrogen atom, a sulfur atom, and a halogen atom (a fluorine atom, a chlorine atom, a bromine atom, and the like). The hetero atom may be bonded to another hetero atom, carbon atom, or hydrogen atom to form a functional group.

From the perspective of being more excellent in the effect of the present invention, the isocyanate compound (B) is preferably a compound represented by Formula (B2) below.

[Chemical Formula 5]

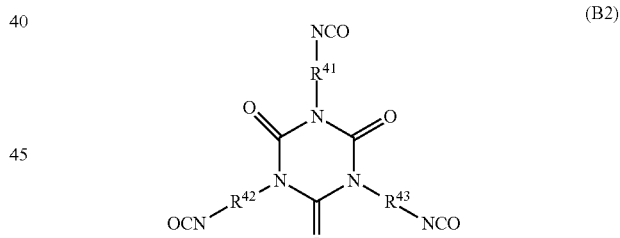

(B2)

In Formula (B2), $R^{41}$, $R^{42}$, and $R^{43}$ each independently represent a hydrocarbon group that may have a heteroatom.

The hydrocarbon group that may have a heteroatom as $R^{41}$ or the like is synonymous with that described above.

From the perspective of being more excellent in the effect of the present invention, the isocyanate compound (B) preferably includes an isocyanurate of aliphatic polyisocyanate described below, more preferably includes an isocyanurate of pentamethylene diisocyanate (compound represented by Formula (B2-1) below) and/or an isocyanurate of hexamethylene diisocyanate (compound represented by Formula (B2-2) below), and still more preferably includes an isocyanurate of pentamethylene diisocyanate.

[Chemical Formula 6]

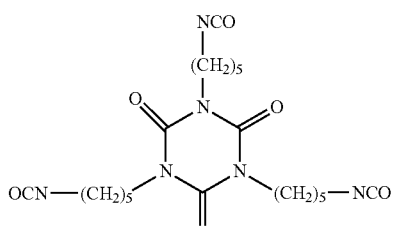

(B2-1)

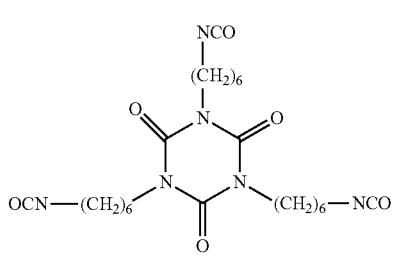

(B2-2)

The isocyanate compound (B) can be constituted by, for example, a polyisocyanate compound. The polyisocyanate compound is not particularly limited as long as the polyisocyanate compound is a compound in which a plurality of isocyanate groups are bonded to the linking group. Specifically, an aliphatic polyisocyanate (a compound in which a plurality of isocyanate groups are bonded to the aliphatic hydrocarbon group) is preferable.

Examples of the aliphatic polyisocyanate include aliphatic diisocyanates such as pentamethylene diisocyanate (PDI) and hexamethylene diisocyanate (HDI).

The polyisocyanate compound that can constitute the isocyanate compound (B) may be one type or a combination of two or more types.

The isocyanate compound (B) is preferably a compound represented by Formula (B2-1) above because it is more excellent in the effect of the present invention (initial adhesiveness and adhesion durability) and is easily added into the composition due to its low viscosity.

(Content of Isocyanate Compound (B))

From the perspective of being more excellent in the effect of the present invention (particularly adhesion durability), the content of the isocyanate compound (B) is preferably from 0.10 to 10.0% by mass, and more preferably from 0.50 to 5.0% by mass, relative to the total amount of the composition according to an embodiment of the present invention.

<Adduct>

The adduct contained in the composition according to an embodiment of the present invention is a reaction product obtained by adding the compound represented by Formula (X) and a phenol compound.

In the present invention, the adduct can function as a tackifier.

<Compound Represented by Formula (X)>

In the present invention, one compound forming the adduct is a compound represented by Formula (X).

[Chemical Formula 7]

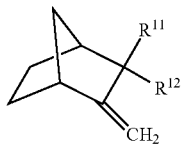

(X)

In Formula (X), $R^{11}$ and $R^{12}$ each independently represent a hydrocarbon group.

<Hydrocarbon Group>

The hydrocarbon group as $R^{11}$ and $R^{12}$ is not particularly limited. The hydrocarbon group may have a heteroatom. An example of a preferable aspect is one in which the hydrocarbon group includes only a carbon atom and a hydrogen atom.

The hydrocarbon group is not particularly limited, and specific examples thereof include aliphatic hydrocarbon groups, aromatic hydrocarbon groups, and combinations thereof. Among these, aliphatic hydrocarbon groups are preferred.

The aliphatic hydrocarbon group may be any of linear, branched, cyclic, or a combination thereof. Specific examples of the aliphatic hydrocarbon group include linear or branched aliphatic hydrocarbon groups. From the perspective of being more excellent in the effect of the present invention, the aliphatic hydrocarbon group is preferably a linear aliphatic hydrocarbon group.

The number of carbon atoms of the aliphatic hydrocarbon group is preferably from 1 to 20, and more preferably from 1 to 10, from the perspective of being more excellent in the effect of the present invention.

From the perspective of being more excellent in the effect of the present invention, the aliphatic hydrocarbon group is preferably a methyl group, an ethyl group, a propyl group, a butyl group, a pentyl group, a hexyl group, a heptyl group, an octyl group, a nonyl group, and a decyl group, and more preferably a methyl group.

Examples of the aromatic hydrocarbon group include aryl groups, and naphthyl groups. Examples of the aryl group include aryl groups having from 6 to 18 carbon atoms, such as a phenyl group, tolyl group, and xylyl group.

The hetero atom that may be included in the hydrocarbon group is not particularly limited, and specific examples thereof include an oxygen atom, a nitrogen atom, a sulfur atom, and a halogen atom (a fluorine atom, a chlorine atom, a bromine atom, and the like). The hetero atom may be bonded to another hetero atom, carbon atom, or hydrogen atom to form a functional group.

From the perspective of being more excellent in the effect of the present invention, the compound represented by Formula (X) above is preferably camphene. Camphene is a compound represented by Formula (X1) below:

[Chemical Formula 8]

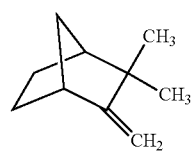

(X1)

<Phenol Compound>

In the present invention, the other compound forming the adduct is a phenol compound.

The phenol compound is not particularly limited as long as the phenol compound is a compound in which a hydroxy group is bonded to a benzene ring.

The phenol compound can have one or more phenolic hydroxy groups (hydroxy groups directly bonded to a benzene ring) per molecule and preferably has one phenolic hydroxy group.

Examples of the phenol compound include a compound represented by Formula (Y) below.

[Chemical Formula 9]

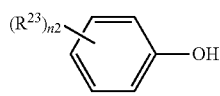

(Y)

In Formula (Y), $R^{23}$ represents a substituent, and n2 represents 0 or from 1 to 4.

Examples of the substituent as $R^{23}$ in Formula (Y) include hydrocarbon groups and hydroxy groups.

n2 represents 0 or from 1 to 4, and from the perspective of being more excellent in the effect of the present invention, n2 is preferably 0.

The phenol compound is, for example, preferably phenol from the perspective of being more excellent in the effect of the present invention.

From the perspective of being more excellent in the effect of the present invention and low odor, the adduct is preferably a reaction product of one molecule of the compound represented by Formula (X) above and one molecule of the phenol compound.

From the perspective of being more excellent in the effect of the present invention, the adduct preferably has a phenolic hydroxy group or phenoxy group (both of which may further have the substituent on a benzene ring) from the phenol compound.

The adduct may include at least the reaction product. In addition to the reaction product, the adduct may further include a reaction by-product or unreacted product.

Examples of the adduct include compounds represented by Formulas (Z1) to (Z3) below.

[Chemical Formula 10]

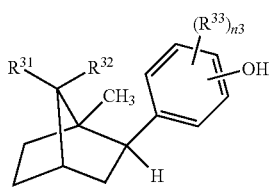

(Z1)

In Formula (Z1), $R^{31}$ and $R^{32}$ each independently represent a hydrocarbon group, $R^{33}$ represents a substituent, and n3 represents 0 or from 1 to 4.

In Formula (Z1), the hydrocarbon group as $R^{31}$ or $R^{32}$ is similar to the hydrocarbon group as $R^{11}$ or $R^{12}$ in Formula (X).

The substituent as $R^{33}$ is similar to the substituent as $R^{23}$ in Formula (Y).

n3 represents 0 or from 1 to 4, and 0 is preferable.

[Chemical Formula 11]

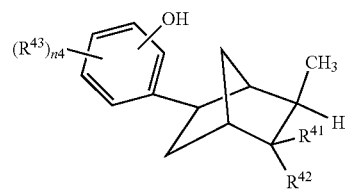

(Z2)

In Formula (Z2), $R^{41}$ and $R^{42}$ each independently represent a hydrocarbon group, $R^{43}$ represents a substituent, and n4 represents 0 or from 1 to 4.

In Formula (Z2), the hydrocarbon group as $R^{41}$ or $R^{42}$ is similar to the hydrocarbon group as $R^{11}$ or $R^{12}$ in Formula (X).

The substituent as $R^{43}$ is similar to the substituent as $R^{23}$ in Formula (Y).

n4 represents 0 or from 1 to 4, and 0 is preferable.

[Chemical Formula 12]

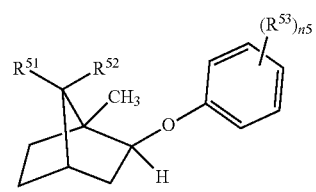

(Z3)

In Formula (Z3), $R^{51}$ and $R^{52}$ each independently represent a hydrocarbon group, $R^{53}$ represents a substituent, and n5 represents 0 or from 1 to 4.

In Formula (Z3), the hydrocarbon group as $R^{51}$ or $R^{52}$ is similar to the hydrocarbon group as $R^{11}$ or $R^{12}$ in Formula (X).

The substituent as $R^{53}$ is similar to the substituent as $R^{23}$ in Formula (Y).

n5 represents 0 or from 1 to 4, and 0 is preferable.

From the perspective of being more excellent in the effect of the present invention and low odor, the adduct preferably contains at least one compound selected from the group consisting of Compound 1 represented by Formula (Z1-1) below, Compound 2 represented by Formula (Z1-2), Compound 3 represented by Formula (Z2-1), Compound 4 represented by Formula (Z2-2), and Compound 5 represented by Formula (Z3-1).

[Chemical Formula 13]

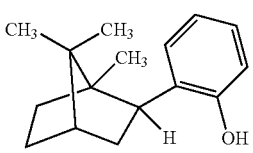

(Z1-1)

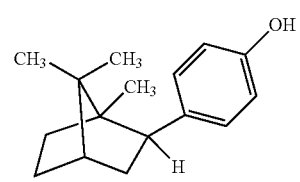

(Z1-2)

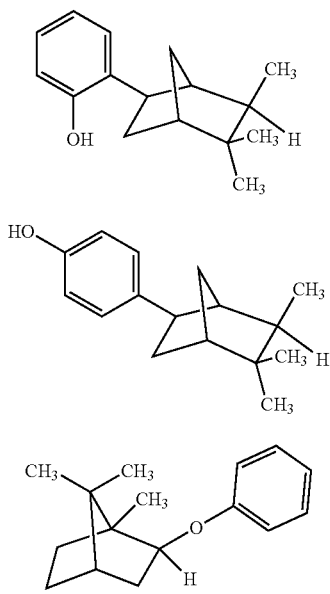

Production Method

A method of producing the adduct is not particularly limited as long as the production method is a method of reacting the compound represented by Formula (X) above with the phenol compound.

In the reaction, a used amount of the compound represented by Formula (X) above and a used amount of the phenol compound are not particularly limited.

When reacting the compound represented by Formula (X) above with the phenol compound, the used amount of the compound represented by Formula (X) above and the used amount of the phenol compound (molar ratio; the compound represented by (X):phenol compound) can be, for example, 1:0.5 to 2, 1:0.8 to 1.2 is preferable, and 1:1 is more preferable.

The compound represented by Formula (X) above and the phenol compound can be reacted in the presence of a catalyst. Examples of the catalyst include boron trifluoride ether complexes.

The compound represented by Formula (X) above and the phenol compound may be reacted in a solvent. Examples of the solvent include aromatic hydrocarbons such as benzene and toluene; aliphatic hydrocarbons such as cyclohexane; and halogenated hydrocarbons such as carbon tetrachloride.

A reaction temperature when reacting the compound represented by Formula (X) above with the phenol compound can be, for example, from 0 to 100° C.

(Content of Adduct)

From the perspective of being more excellent in the effect of the present invention, the content of the adduct is preferably from 0.05 to 10% by mass, and more preferably from 0.1 to 1.0% by mass, relative to the total amount of the composition according to an embodiment of the present invention.

(Mass Ratio of Isocyanate Compound (B)/Adduct)

A mass ratio of the content of the isocyanate compound (B) to the content of the adduct (mass ratio of isocyanate compound (B):adduct) is preferably from 0.1:1 to 50:1, and more preferably from 10:1 to 2:1 from the perspective of being more excellent in the effect of the present invention.

The composition according to an embodiment of the present invention may be formed into a one-part type composition or a two-part type composition.

(Two-Part Type Adhesive Composition)

When the composition according to an embodiment of the present invention is a two-part type composition, the two-part type adhesive composition can have a main agent and a curing agent (curing agent in a broad sense).

•Main Agent

An example of a preferable aspect is one in which the main agent includes the urethane prepolymer (A), the isocyanate compound (B), and the adduct.

•Curing Agent

The curing agent (in a broad sense) described above can contain a compound (curing agent in a narrow sense) having a plurality of active hydrogen-containing groups per molecule. The curing agent in the narrow sense means a compound that substantially reacts with the urethane prepolymer (A) to cure the adhesive composition. The curing agent in the broad sense may include at least the curing agent in a narrow sense.

Examples of the curing agent in the narrow sense include those similar to the active hydrogen compound that can be used in production of the urethane prepolymer (A).

The curing agent in a narrow sense is preferably polyether polyol or polybutadiene polyol.

The polyether polyol is the same as the polyether polyol described above.

Polybutadiene polyol is a polymer which has two or more hydroxy groups and in which the main chain is a copolymer of polybutadiene or butadiene.

Examples of the main chain of the polybutadiene polyol include butadiene homopolymer and a copolymer of butadiene and other monomer components. Examples of monomer components that can be copolymerized with butadiene include styrene and acrylonitrile. The monomer component can be used alone or in combination of two or more kinds.

The polybutadiene polyol may be hydrogenated.

The number of hydroxy groups that can be contained in polybutadiene polyol per molecule can be two or more. The number of hydroxy groups that can be contained in polybutadiene polyol per molecule may be an average value.

In the polybutadiene polyol, a position at which the hydroxy group is bonded is not particularly limited, and the hydroxy group is preferably bonded to a terminal.

An example of a preferable aspect is one in which the polybutadiene polyol is liquid at room temperature.

Commercially available products such as R45HT and R15HT (both available from Idemitsu Kosan Co., Ltd.) can be used as the polybutadiene polyol.

In the case of the two-part type, for example, the urethane prepolymer (A) can be used in an amount such that an amount of isocyanate group per 1 mol of an active hydrogen-containing group (for example, hydroxy group) in the curing agent in the narrow sense is, for example, from 1.5 to 2.5 mol.

Other Optional Components

The composition according to an embodiment of the present invention can further contain, as required, various additives such as a filler (for example, carbon black and calcium carbonate), an isocyanate compound other than the urethane prepolymer (A) and the isocyanate compound (B), a curing catalyst, a plasticizer, an anti-aging agent, an antioxidant, a silane coupling agent, a pigment (dye), a tackifier other than the adduct described above, a terpene compound such as terpineol (excluding the adduct described above), a thixotropic agent, a UV absorber, a flame retardant, a surfactant (including a leveling agent), a dispersant, a dehydrating agent, and an antistatic agent, in the range where the additives do not impair the object of the present invention.

Note that, for example, the filler may be subjected to surface treatment by at least one treatment agent selected from the group consisting of fatty acid, resin acid, a urethane compound, and fatty acid ester.

When the composition according to an embodiment of the present invention is the two-part type composition, whether the optional components are added to the main agent or the curing agent can be selected appropriately.

•Carbon Black

The composition according to an embodiment of the present invention preferably further contains carbon black.

The carbon black is not particularly limited. Examples of the carbon black include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), and Medium Thermal (MT).

Specifically, SEAST 9 (available from Tokai Carbon Co., Ltd.) as the SAF, Showa Black N 220 (available from Showa Cabot K.K.) as the ISAF, SEAST 3 (available from Tokai Carbon Co., Ltd.) and Niteron #200 (available from NSCC Carbon Co., Ltd.) as the HAF, and HTC #100 (available from Chubu Carbon K.K.) as the FEF are exemplified. Additionally, Asahi #55 (available from Asahi Carbon Co., Ltd.) and SEAST 5 (available from Tokai Carbon Co., Ltd.) as the GPF, Asahi #50 (available from Asahi Carbon Co., Ltd.) and Mitsubishi #5 (available from Mitsubishi Chemical Corporation) as the SRF, Asahi Thermal (available from Asahi Carbon Co., Ltd.) and HTC #20 (available from Chubu Carbon K.K.) as the FT, Asahi #15 (available from Asahi Carbon Co., Ltd.) as the MT, and the like are exemplified.

The content of the carbon black is preferably from 30 to 70 parts by mass, and more preferably from 40 to 60 parts by mass, with respect to 100 parts by mass of the urethane prepolymer (A).

•Calcium Carbonate

The composition according to an embodiment of the present invention preferably further contains calcium carbonate.

The calcium carbonate is not particularly limited. Examples of the calcium carbonate include heavy calcium carbonate, precipitated calcium carbonate (light calcium carbonate), and colloidal calcium carbonate.

A content of the calcium carbonate is preferably from 20 to 150 parts by mass, more preferably from 20 to 120 parts by mass, and even more preferably from 30 to 70 parts by mass, with respect to 100 parts by mass of the urethane prepolymer (A) or the curing agent in the narrow sense.

Examples of a filler other than carbon black and calcium carbonate include an organic or inorganic filler of any form. Specific examples of the filler include silica such as fumed silica, calcined silica, precipitated silica, pulverized silica, and molten silica; diatomaceous earth; iron oxide, zinc oxide, titanium oxide, barium oxide, magnesium oxide; magnesium carbonate, zinc carbonate; pyrophyllite clay, kaolin clay, calcined clay; and fatty acid-treated products, resin acid-treated products, urethane compound-treated products, and fatty acid ester-treated products of these.

•Curing Catalyst

The curing catalyst is not particularly limited, and specific examples of the curing catalyst include carboxylic acids such as 2-ethylhexanoic acid and oleic acid; phosphoric acids such as polyphosphoric acid, ethyl acid phosphate, and butyl acid phosphate; a bismuth catalyst such as bismuth octylate; a tin catalyst such as dibutyltin dilaurate and dioctyltin dilaurate; and a tertiary amine catalyst such as 1,4-diazabicyclo[2.2.2]octane, 2,4,6-tris(dimethylaminomethyl)phenol (for example, DMP-30), and a compound including a dimorpholinodiethyl ether structure.

From the perspective of more excellent predetermined adhesiveness, the curing catalyst preferably includes a dimorpholinodiethyl ether structure.

The dimorpholinodiethyl ether structure is a structure including dimorpholinodiethyl ether as a basic backbone.

In the dimorpholinodiethyl ether structure, a hydrogen atom in a morpholine ring may be substituted with a substituent. The substituent is not particularly limited. Examples of the substituent include an alkyl group. Examples of the alkyl group include a methyl group and an ethyl group.

Examples of the amine catalyst including the dimorpholinodiethyl ether structure include a compound represented by Formula (9) below.

[Chemical Formula 14]

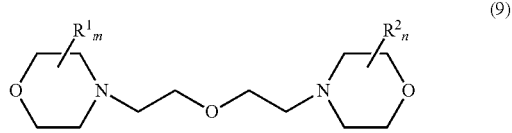

(9)

In Formula (9) above, $R^1$ and $R^2$ are each independently an alkyl group, and m and n are each independently 0, 1, or 2.

Specific examples of the amine catalyst including the dimorpholinodiethyl ether structure include dimorpholinodiethyl ether (DMDEE), di(methylmorpholino)diethyl ether, and di(dimethylmorpholino)diethyl ether.

The curing catalyst can be used alone or in combination of two or more types thereof.

A content of the curing catalyst is preferably from 0.05 to 2.0 parts by mass and more preferably from 0.1 to 0.5 parts by mass, with respect to 100 parts by mass of the urethane prepolymer (A) or the curing agent in the narrow sense.

•Plasticizer

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer is preferably from 1 to 50 parts by mass, and more preferably from 5 to 40 parts by mass, with respect to 100 parts by mass of the urethane prepolymer.

Production Method

When the composition according to an embodiment of the present invention is the one-part type composition, the production method thereof is not particularly limited, and the composition can be produced, for example, by a method of mixing the urethane prepolymer (A), the isocyanate compound (B), the adduct, and other optional components that can be used as necessary.

When the composition according to an embodiment of the present invention is the two-part type composition, the production method thereof is not particularly limited, and the composition can be produced, for example, by a method in which the main agent and the curing agent are charged in separate containers, and are mixed in a nitrogen gas atmosphere in the respective container interiors.

As a method of use of the two-part type, the main agent and the curing agent may be used by mixing them.

Base Material

Examples of the base material to which the composition according to an embodiment of the present invention can be applied include plastics, glass, rubbers, metals, and the like.

Suitable examples of the base material include a base material including an olefin resin.

The base material including an olefin resin may be a base material obtained from a mixture of the olefin resin and a filler such as carbon fibers, glass such as glass fillers, talc, calcium carbonate, or alumina.

The plastic may be, for example, a homopolymer, a copolymer, or a hydrogenated product. The same applies to rubber.

Specific examples of the plastic include olefin resins, such as polypropylene, polyethylene, ethylene propylene copolymers, COP (cycloolefin polymers), and COC (cycloolefin copolymers);

polyester resins, such as polyethylene terephthalate (PET) and polybutylene terephthalate (PBT);

polymethyl methacrylate resins (PMMA resins); polycarbonate resins; polystyrene resins; acrylonitrile-styrene copolymer resins; polyvinyl chloride resins; acetate resins; ABS resins (acrylonitrile-butadiene-styrene resins); and polyamide resins.

"COC" means a cycloolefin copolymer such as a copolymer of tetracyclododecene and olefin such as ethylene.

Additionally, "COP" means a cycloolefin polymer such as a polymer obtained by, for example, subjecting norbornenes to ring-opening polymerization and hydrogenation.

The plastic may be a poorly adhesive resin.

The base material may be subjected to surface treatment. Examples of the surface treatment include flame treatment, corona treatment, and ITRO treatment. A method of the surface treatment is not particularly limited. Examples of the method include a known method.

The method of applying the composition according to an embodiment of the present invention to the base material is not particularly limited. Examples of the method include a known method.

When the composition according to an embodiment of the present invention is used, the effect of the present invention can be exhibited at an excellent level without using a primer to the base material.

the composition according to an embodiment of the present invention can be cured by moisture or the like. For example, the composition according to an embodiment of the present invention can be cured in the condition of 5 to 90° C. at a relative humidity (RH) of 5 to 95%.

(Application)

Examples of the use of the composition according to an embodiment of the present invention include direct glazing adhesives, sealants for automobiles, and sealants for building components.

EXAMPLES

An embodiment of the present invention will be described below in detail by way of examples. However, an embodiment of the present invention is not limited to such examples.

<Production of One-Part Type Adhesive Composition>

Components shown in the column of "Main agent" shown in Table 1 below are mixed according to a composition (parts by mass) shown in the same table by using an agitator. The resulting mixture was used as a one-part adhesive composition.

Comparative Examples 1 to 3 and 5 to 7 and Examples 1 to 5 and 7 are one-part adhesive compositions.

<Production of Two-Part Type Adhesive Composition>

Each main agent and each curing agent were produced by mixing components of Table 1 below according to composition (parts by mass) shown in the same table by using an agitator to obtain a two-part type adhesive composition.

Next, 100 g of the main agent produced as described above and the curing agent produced as described above were mixed at a mass ratio shown in the column of "Main agent/curing agent" shown in Table 1, and a mixture of a two-part type adhesive composition was obtained.

Comparative Example 4 and Example 6 are two-part type adhesive compositions.

<Preparation of Test Sample>

(Initial Test Sample)

A test sample was formed using a composition containing polypropylene resin and glass fibers (GF) (trade name: Funcster, available from Japan Polypropylene Corporation), and two base materials (width: 25 mm, length: 120 mm, thickness: 3 mm) in which flame treatment was applied to one surface were provided. After the flame treatment, it was confirmed that the wettability on the surface of the resin was 45.0 mN/m or greater, using the Wetting Tension Test Mixture (available from Wako Pure Chemical Industries, Ltd.).

Then, a mixture of the one-part type adhesive composition or the two-part type adhesive composition was applied onto the flame-treated surface of one of the base materials in a manner that the width was 25 mm, the length was 10 mm, and the thickness was 5 mm, and then the coated surface was adhered to the flame-treated surface of the other base material, and compression-bonded.

If the composition used was a one-part type, the mixture was left for seven days under conditions at 23° C. and 50% RH, to prepare an initial test sample.

If the composition used was a two-part type, the mixture was left for three days under conditions at 23° C. and 50% RH, to prepare an initial test sample.

(Test Sample after Water Immersion Aging)

•Water Immersion Aging Test

A water immersion aging test was performed in which each initial test sample was immersed for 2,000 hours in warm water at 50° C. to obtain a test sample after water immersion aging.

(Test Sample after Heat Aging)

A heat aging test was performed in which each initial test sample was left for 2,000 hours at 90° C. to obtain a test sample after heat aging.

<Evaluation>

For each test sample produced as described above, the adhesiveness was evaluated by the methods described below. The results are shown in Table 1.

(Tensile Test)

For each test sample prepared as described above, a tensile test (pulling speed of 50 mm/min at 20° C.) was performed in accordance with JIS K6850:1999, a failure state of each test sample was visually observed, and a shear strength (MPa) of each test sample was measured.

•Evaluation Criteria for Initial Adhesiveness

For the failure state of the initial adhesion test sample after the tensile test, the test sample in which cohesive failure was observed in the adhesive was evaluated as "CF", and the test sample in which interfacial peeling was observed between an adherend and the adhesive was evaluated as "AF". "CF/AF" represents coexistence of cohesive failure and interfacial peeling.

•"Very Excellent Initial Adhesiveness"

In the present invention, a case where the failure state of the initial test sample after the tensile test was "CF" and initial shear strength was 3 MPa or more was evaluated as "very excellent initial adhesiveness" and indicated as "Good".

•"Slightly Excellent Initial Adhesiveness"

A case where the failure state was "CF" and the initial shear strength was less than 3 MPa or a case where the failure state was "CF/AF" and the initial shear strength was 2 MPa or more was evaluated as "slightly excellent initial adhesiveness" and indicated as "Marginal".

•"Poor Initial Adhesiveness"

A case where the failure state was "CF/AF" and the initial shear strength was less than 2 MPa or a case where the failure state was "AF" was evaluated as "poor initial adhesiveness" and indicated as "Poor".

•Acceptance Criteria for Initial Adhesiveness

When the evaluation result of the initial test sample is not less than "Marginal", the initial adhesiveness is determined to be excellent (acceptance).

•Evaluation Criteria for Shear Strength of Initial Test Sample

When the evaluation result of the failure state of the initial test sample is equivalent, of the test samples, the one with higher shear strength is evaluated to have more excellent initial adhesiveness.

•Evaluation Criteria for Adhesion Durability

"CF", "AF", and "CF/AF" for the failure state of the test sample after water immersion aging or the test sample after heat aging are similar to the failure state after the tensile test of the initial adhesion test sample.

•"Most Excellent Adhesion Durability"

In the present invention, a case where in the test sample after water immersion aging and the test sample after heat aging, the failure state was "CF" and the shear strength was 3 MPa or more was evaluated as "most excellent adhesion durability" and indicated as "Excellent".

•"Very Excellent Adhesion Durability"

When in the test sample after water immersion aging or the test sample after heat aging, the failure state was "CF" and the shear strength was 3 MPa or more, and when in the remaining test sample, the failure state was "CF" and the shear strength was less than 3 MPa, or when in the remaining test sample, the failure state was "CF/AF" and the shear strength was 2 MPa or more, these cases were evaluated as "very excellent adhesion durability" and indicated as "Good".

•"Slightly Excellent Adhesion Durability"

(I) When in the test sample after water immersion aging and the test sample after heat aging, the failure state was "CF" and the shear strength was less than 3 MPa, (II) when in the test sample after water immersion aging and the test sample after heat aging, the failure state was "CF/AF" and the shear strength was 2 MPa or more, (III) when in the test sample after water immersion aging or the test sample after heat aging, the failure state was "CF" and the shear strength was 3 MPa or more, and in the remaining test sample, the failure state was "CF/AF" and the shear strength was less than 2 MPa, or (IV) when in the test sample after water immersion aging or the test sample after heat aging, the failure state was "CF" and the shear strength was less than 3 MPa, and in the remaining test sample, the failure state was "CF/AF" and the shear strength was 2 MPa or more, these cases were evaluated as "slightly excellent adhesion durability" and indicated as "Marginal".

•"Poor Adhesion Durability"

(V) When in the test sample after water immersion aging or the test sample after heat aging, the failure state was "CF" and the shear strength was less than 3 MPa, or the failure state was "CF/AF" and the shear strength was 2 MPa or more, in the remaining test sample, the failure state was "CF/AF" and the shear strength was less than 2 MPa, (VI) in both the test sample after water immersion aging and the test sample after heat aging, the failure state was "CF/AF" and the shear strength was less than 2 MPa, or (VII) in one of or both the test sample after water immersion aging and the test sample after heat aging, the failure state was "AF", these cases were evaluated as "poor adhesion durability" and indicated as "Poor".

•Acceptance Criteria for Adhesion Durability

When the evaluation result of the adhesion durability is not less than "Marginal", the adhesion durability is determined to be excellent (acceptance).

•Evaluation Criteria for Shear Strength in Adhesion Durability

When the evaluation result of the failure state of the test sample after water immersion aging is equivalent, of the test samples, the one with higher shear strength is preferable. The same applies to the test sample after heat aging.

TABLE 1-1

| Table 1 | | | Comparative Example 1 | Comparative Example 2 | Comparative Example 3 | Comparative Example 4 |
|---|---|---|---|---|---|---|
| Main agent | Urethane prepolymer 1 | Urethane prepolymer | 42.0 | 42.0 | 42.0 | 42.0 |
| | Isocyanate compound (B) 1 | PDI nurate | | 2.00 | | |
| | Isocyanate compound (B) 2 | HDI nurate | | | | |
| | (Comparison) Isocyanate compound | | | | | |
| | Adduct | Adduct of camphene and phenol | | | 0.50 | |
| | (Comparison) Rosin resin | | | | | |

TABLE 1-1-continued

| | Table 1 | | Comparative Example 1 | Comparative Example 2 | Comparative Example 3 | Comparative Example 4 |
|---|---|---|---|---|---|---|
| | (Comparison) Octyl gallate | | | | | |
| | Carbon black | 200 MP | 20.6 | 20.6 | 20.6 | 20.6 |
| | Calcium carbonate 1 | Super S | 19.3 | 19.3 | 19.3 | 19.3 |
| | Plasticizer 1 | DINP | 15.5 | 15.5 | 15.5 | 15.5 |
| | Curing catalyst 1 | DMDEE | 0.15 | 0.15 | 0.15 | 0.15 |
| | Total | | 97.55 | 99.55 | 98.1 | 97.55 |
| Curing agent | Polyol compound 1 | PPG1000 (F = 3) | | | | 45.9 |
| | Polyol compound 2 | R-45HT | | | | 5.0 |
| | Terpene compound | Terpineol | | | | 2 |
| | Calcium carbonate 2 | KALFAIN 200 | | | | 46.8 |
| | Curing catalyst 1 | DMDEE | | | | 0.3 |
| | Total | | 0.0 | 0.0 | 0.0 | 100.0 |
| | Main agent/curing agent (mass ratio) | | | | | 10/1 |
| | Shear test results PP-GF*/PP-GF* | Initial | Failure state | AF | AF | CF | AF |
| | | | Strength [MPa] | 0.65 | 1.89 | 3.80 | 0.49 |
| | | After water immersion aging | Failure state | AF | CF/AF | CF/AF | AF |
| | | | Strength [MPa] | 0.44 | 2.21 | 1.58 | 0.44 |
| | | After heat aging | Failure state | AF | CF | AF | AF |
| | | | Strength [MPa] | 0.72 | 3.67 | 1.39 | 0.57 |
| | Initial adhesiveness determination Good Marginal Poor . . . Not less than Marginal is acceptance | | Poor | Poor | Good | Poor |
| | Adhesion durability determination Excellent Good Marginal Poor . . . Not less than Marginal is acceptance | | Poor | Good | Poor | Poor |

TABLE 1-2

| | Table 1 | | Comparative Example 5 | Comparative Example 6 | Comparative Example 7 | Example 1 | Example 2 |
|---|---|---|---|---|---|---|---|
| Main agent | Urethane prepolymer 1 | Urethane prepolymer | 42.0 | 42.0 | 42.0 | 42.0 | 42.0 |
| | Isocyanate compound (B) 1 | PDI nurate | 2.00 | 2.00 | | 2.00 | 10.00 |
| | Isocyanate compound (B) 2 | HDI nurate | | | | | |
| | (Comparison) Isocyanate compound | | | | 2.00 | | |
| | Adduct | Adduct of camphene and phenol | | | 0.50 | 0.50 | 0.50 |
| | (Comparison) Rosin resin | | 0.50 | | | | |
| | (Comparison) Octyl gallate | | | 0.50 | | | |
| | Carbon black | 200 MP | 20.6 | 20.6 | 20.6 | 20.6 | 20.6 |
| | Calcium carbonate 1 | Super S | 19.3 | 19.3 | 19.3 | 19.3 | 19.3 |
| | Plasticizer 1 | DINP | 15.5 | 15.5 | 15.5 | 15.5 | 15.5 |
| | Curing catalyst 1 | DMDEE | 0.15 | 0.15 | 0.15 | 0.15 | 0.15 |
| | Total | | 100.1 | 100.1 | 100.1 | 100.1 | 108.1 |
| Curing agent | Polyol compound 1 | PPG1000 (F = 3) | | | | | |
| | Polyol compound 2 | R-45HT | | | | | |
| | Terpene compound | Terpineol | | | | | |
| | Calcium carbonate 2 | KALFAIN 200 | | | | | |
| | Curing catalyst 1 | DMDEE | | | | | |
| | Total | | 0.0 | 0.0 | 0.0 | 0.0 | 0.0 |
| | Main agent/curing agent (mass ratio) | | | | | | |
| | Shear test results PP-GF*/PP-GF* | Initial | Failure state | CF | CF | AF | CF | CF/AF |

TABLE 1-2-continued

| Table 1 | | | Comparative Example 5 | Comparative Example 6 | Comparative Example 7 | Example 1 | Example 2 |
|---|---|---|---|---|---|---|---|
| | | Strength [MPa] | 3.15 | 3.37 | 1.59 | 3.89 | 3.25 |
| | After water immersion aging | Failure state | AF | CF/AF | CF | CF | CF |
| | | Strength [MPa] | 1.80 | 1.94 | 3.08 | 4.01 | 3.22 |
| | After heat aging | Failure state | CF/AF | CF/AF | CF/AF | CF | CF |
| | | Strength [MPa] | 1.62 | 1.55 | 1.89 | 3.85 | 3.48 |
| | Initial adhesiveness determination Good Marginal Poor . . . Not less than Marginal is acceptance | | Good | Good | Poor | Good | Marginal |
| | Adhesion durability determination Excellent Good Marginal Poor . . . Not less than Marginal is acceptance | | Poor | Poor | Marginal | Excellent | Excellent |

TABLE 1-3

| | Table 1 | | Example 3 | Example 4 | Example 5 | Example 6 | Example 7 |
|---|---|---|---|---|---|---|---|
| Main agent | Urethane prepolymer 1 | Urethane prepolymer | 42.0 | 42.0 | 42.0 | 42.0 | 42.0 |
| | Isocyanate compound (B) 1 | PDI nurate | 0.10 | 2.00 | 2.00 | 2.00 | |
| | Isocyanate compound (B) 2 | HDI nurate | | | | | 2.00 |
| | (Comparison) Isocyanate compound | | | | | | |
| | Adduct | Adduct of camphene and phenol | 0.50 | 5.00 | 0.05 | 0.50 | 0.50 |
| | (Comparison) Rosin resin | | | | | | |
| | (Comparison) Octyl gallate | | | | | | |
| | Carbon black | 200 MP | 20.6 | 20.6 | 20.6 | 20.6 | 20.6 |
| | Calcium carbonate 1 | Super S | 19.3 | 19.3 | 19.3 | 19.3 | 19.3 |
| | Plasticizer 1 | DINP | 15.5 | 15.5 | 15.5 | 15.5 | 15.5 |
| | Curing catalyst 1 | DMDEE | 0.15 | 0.15 | 0.15 | 0.15 | 0.15 |
| | Total | | 98.2 | 104.6 | 99.6 | 100.05 | 100.1 |
| Curing agent | Polyol compound 1 | PPG1000 (F = 3) | | | | 45.9 | |
| | Polyol compound 2 | R-45HT | | | | 5.0 | |
| | Terpene compound | Terpineol | | | | 2 | |
| | Calcium carbonate 2 | KALFAIN 200 | | | | 46.8 | |
| | Curing catalyst 1 | DMDEE | | | | 0.3 | |
| | Total | | 0.0 | 0.0 | 0.0 | 100.0 | 0.0 |
| | Main agent/curing agent (mass ratio) | | | | | 10/1 | |
| | Shear test results PP-GF*/PP-GF* | Initial | Failure state | CF | CF/AF | CF/AF | CF | CF |
| | | | Strength [MPa] | 3.64 | 2.73 | 2.54 | 3.46 | 3.74 |
| | | After water immersion aging | Failure state | CF/AF | CF | CF/AF | CF | CF |
| | | | Strength [MPa] | 2.89 | 3.18 | 2.81 | 3.42 | 3.90 |
| | | After heat aging | Failure state | CF/AF | CF | CF/AF | CF | CF |
| | | | Strength [MPa] | 2.52 | 3.49 | 2.66 | 3.29 | 3.77 |

TABLE 1-3-continued

| Table 1 | Example 3 | Example 4 | Example 5 | Example 6 | Example 7 |
|---|---|---|---|---|---|
| Initial adhesiveness determination Good Marginal Poor . . . Not less than Marginal is acceptance | Good | Marginal | Marginal | Good | Good |
| Adhesion durability determination Excellent Good Marginal Poor . . . Not less than Marginal is acceptance | Marginal | Excellent | Marginal | Excellent | Excellent |

Water immersion aging: 50° C. water immersion × 2000 hours
Heat aging: 90° C. × 2000 hours
Base material (PP-GF*): Funester (available from Japan Polypropylene Corporation)

The details of each component shown in Table 1 are as follows.

(Main Agent: Main Agent of One-Part Type Adhesive Composition or Two-Part Type Adhesive Composition)

Urethane prepolymer 1: urethane prepolymer produced by mixing 70 parts by mass of polyoxypropylene diol (trade name: SANNIX PP2000, available from Sanyo Chemical Industries, Ltd.; weight average molecular weight: 2,000), polyoxypropylene triol (trade name: SANNIX GP3000, available from Sanyo Chemical Industries, Ltd.; weight average molecular weight: 3,000), and MDI (trade name: Sumidur 44S, available from Sumika Bayer Urethane Co., Ltd.) in a manner that NCO/OH (molar ratio) was 2.0, and reacting the mixture in a condition at 80° C. for 5 hours.

Isocyanate compound (B) 1 (PDI nurate): isocyanurate of pentamethylene diisocyanate represented by Formula (B2-1) above (available from Mitsui Chemicals, Inc.). Molecular weight 462

Isocyanate compound (B) 2 (HDI nurate): isocyanurate of hexamethylene diisocyanate represented by Formula (B2-2) above (available from Mitsui Chemicals, Inc.). Molecular weight 504

(Comparison) Isocyanate compound: HDI uretdione (dimer of hexamethylene diisocyanate; having a 4-membered ring). Desmodur N3400, available from Sumika Covestro Urethane Co., Ltd.

Adduct: adduct of camphene and phenol. The adduct contains at least one compound selected from the group consisting of Compound 1 represented by Formula (Z1-1) below, Compound 2 represented by Formula (Z1-2), Compound 3 represented by Formula (Z2-1), Compound 4 represented by Formula (Z2-2), and Compound 5 represented by Formula (Z3-1). Available from Yasuhara Chemical Co., Ltd.

[Chemical Formula 15]

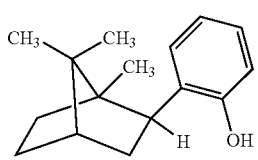
(Z1-1)

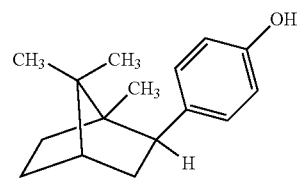
(Z1-2)

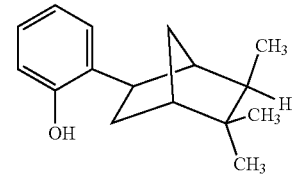
(Z2-1)

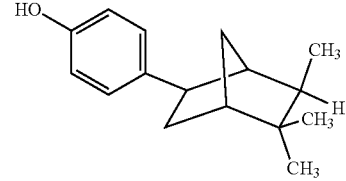
(Z2-2)

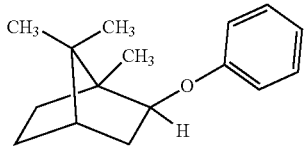
(Z3-1)

(Comparison) Rosin resin: Pinecrystal D6011, available from Arakawa Chemical Industries, Ltd.

(Comparison) Octyl gallate: octyl gallate, available from Construe Chemical Co., Ltd.

Carbon black: trade name: 200MP, available from Nippon Steel Chemical Carbon Co. Ltd., HAF-grade carbon black Calcium carbonate 1: Heavy calcium carbonate, trade name: Super S, available from Maruo Calcium Co., Ltd.

Plasticizer 1: Diisononyl phthalate (DINP), available from J-Plus Co., Ltd.

Curing catalyst 1: Dimorpholinodiethyl ether (DMDEE), trade name: UCAT-660M, available from San-Apro Ltd.

(Curing Agent of Two-Part Type Adhesive Composition)

Polyol compound 1: polyoxypropylene triol, weight average molecular weight 1,000, trade name: EXCENOL 1030, available from Asahi Glass Co., Ltd. The compound corresponds to the curing agent in a narrow sense.

Polyol compound 2: liquid polybutadiene diol having a hydroxyl group at a terminal ("poly bd R-45 HT", available from Idemitsu Kosan Co., Ltd.). The compound corresponds to the curing agent in a narrow sense. The compound is liquid under a room temperature condition. The compound has about two hydroxy groups per molecule.

Terpene compound: terpineol (available from Yasuhara Chemical Co., Ltd.)

Calcium carbonate 2: Calcium carbonate subjected to surface treatment with fatty acid, KALFAIN 200, available from Maruo Calcium Co., Ltd.

Curing catalyst 1: Dimorpholinodiethyl ether (DMDEE), trade name: UCAT-660M, available from San-Apro Ltd.

As can be seen from the results shown in Table 1, Comparative Example 1 (one-part type) and Comparative Example 4 (two-part type), not containing the isocyanate compound (B) and the adduct, exhibited poor initial adhesiveness and poor adhesion durability.

Comparative Example 2 (one-part type) not containing the adduct exhibited poor initial adhesiveness.

Comparative Example 3 (one-part type) not containing the isocyanate compound (B) exhibited poor adhesion durability.

Comparative Example 5 (one-part type) not containing the adduct but instead containing a rosin resin exhibited poor adhesion durability.

Comparative Example 6 (one-part type) not containing the adduct but instead containing an ester such as octyl gallate exhibited poor adhesion durability.

Comparative Example 7 (one-part type) not containing the isocyanate compound (B) but instead containing uretdione of HDI (having a 4-membered ring rather than an isocyanurate ring (6-membered ring)) exhibited poor initial adhesiveness.

In contrast, the composition according to an embodiment of the present invention was excellent in initial adhesiveness and adhesion durability.

Further, the composition according to an embodiment of the present invention was excellent in initial adhesiveness and adhesion durability even when used without a primer.

Further, the composition according to an embodiment of the present invention was excellent in initial adhesiveness and durable adhesiveness particularly to an olefin resin.

Furthermore, the composition according to an embodiment of the present invention was excellent in initial adhesiveness and durable adhesiveness even if the composition was a one-part type composition or a two-part type composition.

The invention claimed is:

1. A urethane adhesive composition comprising:
from 20% to 80% by mass, relative to a total content of the urethane adhesive composition, of a urethane prepolymer (A) having an isocyanate group;
from 5.0% to 10.0% by mass, relative to a total content of the urethane adhesive composition, of an isocyanate compound (B) having an isocyanurate structure and an isocyanate group; and,
an adduct of a compound represented by Formula (X) and a phenol compound,

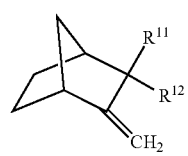

where $R^{11}$ and $R^{12}$ each independently represent a hydrocarbon group.

2. The urethane adhesive composition according to claim 1, wherein the adduct is a reaction product of one molecule of the compound represented by Formula (X) and one molecule of the phenol compound.

3. The urethane adhesive composition according to claim 1, wherein the isocyanate compound (B) comprises an isocyanurate of an aliphatic polyisocyanate.

4. The urethane adhesive composition according to claim 1, wherein the isocyanate compound (B) comprises an isocyanurate of pentamethylene diisocyanate.

5. The urethane adhesive composition according to claim 1, used for adhering a base material containing an olefin resin.

6. A urethane adhesive composition comprising:
from 20% to 80% by mass, relative to a total content of the urethane adhesive composition, of a urethane prepolymer (A) having an isocyanate group;
from 1.5% to 10.0% by mass, relative to a total content of the urethane adhesive composition, of an isocyanate compound (B) having an isocyanurate structure and an isocyanate group; and, from 4.5% to 10.0% by mass, relative to a total content of the urethane adhesive composition, of an adduct of a compound represented by Formula (X) and a phenol compound,

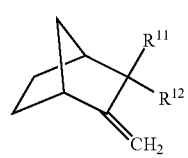

where $R^{11}$ and $R^{12}$ each independently represent a hydrocarbon group.

7. The urethane adhesive composition according to claim 6, wherein the adduct is a reaction product of one molecule of the compound represented by Formula (X) and one molecule of the phenol compound.

8. The urethane adhesive composition according to claim 6, wherein the isocyanate compound (B) comprises an isocyanurate of an aliphatic polyisocyanate.

9. The urethane adhesive composition according to claim 6, wherein the isocyanate compound (B) comprises an isocyanurate of pentamethylene diisocyanate.

10. The urethane adhesive composition according to claim 6, used for adhering a base material containing an olefin resin.

* * * * *